US008382206B2

(12) United States Patent
Grable

(10) Patent No.: US 8,382,206 B2
(45) Date of Patent: Feb. 26, 2013

(54) FORWARD INCREMENTALLY ADJUSTABLE RATCHET HEADREST

(75) Inventor: David M. Grable, Clinton Township, MI (US)

(73) Assignee: BAE Industries, Inc., Warren, MI (US)

( * ) Notice: Subject to any disclaimer, the term of this patent is extended or adjusted under 35 U.S.C. 154(b) by 169 days.

(21) Appl. No.: 13/010,817

(22) Filed: Jan. 21, 2011

(65) Prior Publication Data

US 2011/0175421 A1 Jul. 21, 2011

Related U.S. Application Data

(60) Provisional application No. 61/297,000, filed on Jan. 21, 2010.

(51) Int. Cl.
*B60N 2/48* (2006.01)
(52) U.S. Cl. ....................................... 297/408
(58) Field of Classification Search ............ 297/408
See application file for complete search history.

(56) References Cited

U.S. PATENT DOCUMENTS

| | | | | |
|---|---|---|---|---|
| 2,828,810 | A | * | 4/1958 | Barecki et al. ............ 297/408 X |
| 4,304,439 | A | | 12/1981 | Terada et al. |
| 4,370,898 | A | | 2/1983 | Maruyama |
| 4,576,413 | A | * | 3/1986 | Hatta ......................... 297/408 |
| 4,621,864 | A | | 11/1986 | Hill |
| 4,640,549 | A | * | 2/1987 | Yokota ....................... 297/408 X |
| 4,674,792 | A | * | 6/1987 | Tamura et al. .............. 297/408 |
| 4,674,797 | A | | 6/1987 | Tateyama |
| 4,678,232 | A | | 7/1987 | Ishida et al. |
| 4,693,515 | A | * | 9/1987 | Russo et al. ............... 297/408 X |
| 4,733,913 | A | | 3/1988 | Tateyama |
| 4,830,434 | A | * | 5/1989 | Ishida et al. ................ 297/408 |
| 5,236,245 | A | | 8/1993 | Harrell |
| 5,238,295 | A | | 8/1993 | Harrell |
| 5,642,918 | A | | 7/1997 | Sakamoto et al. |
| 5,738,412 | A | * | 4/1998 | Aufrere et al. ............. 297/408 |
| 5,842,738 | A | | 12/1998 | Knoll et al. |
| 5,934,755 | A | | 8/1999 | Halamish |
| 5,964,505 | A | | 10/1999 | Koenig et al. |
| 6,000,760 | A | | 12/1999 | Chung |
| 6,045,181 | A | | 4/2000 | Ikeda et al. |
| 6,880,890 | B1 | | 4/2005 | DeBrabant |
| 7,325,877 | B2 | | 2/2008 | Brockman et al. |

(Continued)

FOREIGN PATENT DOCUMENTS

KR  1020020068868  8/2002

*Primary Examiner* — Rodney B White
(74) *Attorney, Agent, or Firm* — Gifford, Krass, Sprinkle, Anderson & Citkowski, P.C.

(57) ABSTRACT

A multi-position and manually adjustable headrest having a support bracket affixed atop a seat back and exhibiting a plurality of ratchet defined portions. An intermediate and three dimensional shaped component is pivotally secured in a biased fashion to the ratchet defined bracket, the intermediate component exhibiting a pivotally supported and biased locking pawl which, depending upon a pivotal location of the intermediate component, engages a selected ratchet portion of said support bracket. A pair of headrest bun supporting plates are pivotally secured at upper ends to spaced apart sides of the intermediate pivotal component, the supporting plates further exhibiting lower arcuate extending channels through which seats pin supports projecting laterally from opposite sides of the ratchet support bracket and travel along the channels during forward displacement of the bun supporting plates, such as resulting from a manual readjustment force applied to a headrest bun. Concurrent rotation of the intermediate component in a controlled fashion occurring relative to its upper pivotal connection to the support plates and lower pivotal connection to the ratchet support bracket such that the pivotally supported locking pawl engages a selected ratchet portion of the support bracket between an initial position and at least one succeeding forward adjustment position.

20 Claims, 8 Drawing Sheets

U.S. PATENT DOCUMENTS

| | | |
|---|---|---|
| 7,455,363 B2 | 11/2008 | Chung |
| 7,543,891 B2 | 6/2009 | Chung |
| 7,758,126 B2 * | 7/2010 | Haase .......................... 297/408 |
| 2007/0164593 A1 * | 7/2007 | Brockman ................. 297/408 |

* cited by examiner

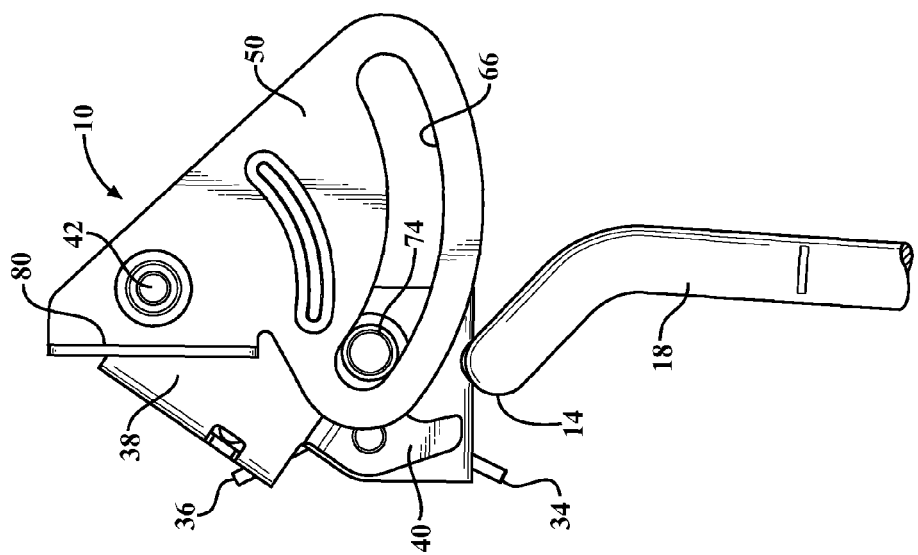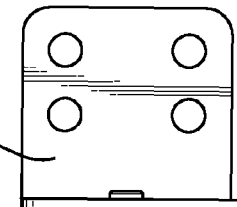

FORWARD INCREMENTALLY ADJUSTABLE RATCHET HEADREST

CROSS REFERENCE TO RELATED APPLICATIONS

The present application claims priority of U.S. Provisional Patent Application Ser. No. 61/297,000 filed Jan. 21, 2010.

FIELD OF THE INVENTION

The present invention discloses a multi-position manually adjustable headrest. A ratchet defined support bracket is affixed upon a central extending portion of a seatback secured rod support associated with the headrest. An intermediate and three dimensional component is pivotally secured in a biased fashion to the ratchet defined bracket and, in turn, exhibits a pivotally supported and biased locking pawl which, depending upon the pivotal location of the intermediate component, engages a selected ratchet location of the support bracket.

Outer headrest bun supporting plates each exhibit a modified triangular shape and are pivotally secured at upper angled ends to spaced apart sides of the intermediate pivotal component. The supporting plates further exhibit lower arcuate extending channels extending along a widened base and through which seats pin supported rivets projecting laterally from the sides of a base portion of the ratchet support bracket.

In this manner the pins and end mounted rivets are guided in travel along the channels during forward displacing travel of the support plates resulting from a manual readjustment force applied to the headrest bun. Concurrently, the intermediate component rotates in a controlled fashion relative to its upper pivotal connection to the support plates and lower pivotal connection to the ratchet support bracket.

The locking pawl pivotally supported relative to an inside mounting surface of the intermediate component and engages the selected locations of the ratchet bracket, such as which are exhibited upon a progressively upward ramped portion, in controlled fashion between a first rearward most design position and a succeeding plurality (such as second through fourth) intermediate and progressively forward manual adjustment positions. An upper-most peak defining portion associated with the upwardly ramped ratcheting portions engages an side location of the locking pawl engagement portion during succeeding adjustment to a fifth-most reset position, this causing the locking pawl to pivot out of engagement with the ramp configured ratchet portions.

A cross support extends between spaced apart sides of the intermediate component and against which is abutted a shoulder location of the pivotal locking pawl at the forward most reset triggering position. The cross support maintains contact with the locking pawl during rearward resetting/returning motion to the first position. The locking pawl also includes an angular configured wing portion, such as extending at an angle relative to and between the ratchet and shoulder engaging portions, and which contacts the peak of the ratchet ramp portion during the final stages of resetting in order to reposition the locking pawl in the initial design position. The configuration of the lower extending leg portions associated with the intermediate component are further such that extending edge locations contact the exterior pin supported rivets in order to define both forward and rearward most adjusted positions of the headrest.

DESCRIPTION OF THE PRIOR ART

Various types of vehicle headrest devices are known such as which can be adjustable in an incremental or ratchet like fashion in order to provide desired support for a seated occupant. One known example is disclosed in U.S. Pat. No. 7,455,363, to Chung, which teaches a discloses a device for moving a headrest back and forth and which includes both tilt adjusting and back and forth movement devices.

SUMMARY OF THE PRESENT INVENTION

The present invention discloses a multi-position and manually adjustable headrest secured atop a vehicle seat and having a support bracket affixed atop a seat back and exhibiting a plurality of ratchet defined portions. An intermediate and three dimensional shaped component is pivotally secured in a biased fashion to the ratchet defined bracket, the intermediate component exhibiting a pivotally supported and biased locking pawl which, depending upon a pivotal location of the intermediate component, engages a selected ratchet portion of said support bracket.

A pair of headrest bun supporting plates are pivotally secured at upper ends to spaced apart sides of the intermediate pivotal component, the supporting plates further exhibiting lower arcuate extending channels through which seats pin supports projecting laterally from opposite sides of the ratchet support bracket and travel along the channels during forward displacement of the bun supporting plates, such as resulting from a manual readjustment force applied to a headrest bun. Concurrent rotation of the intermediate component in a controlled fashion occurring relative to its upper pivotal connection to the support plates and lower pivotal connection to the ratchet support bracket such that the pivotally supported locking pawl engages a selected ratchet portion of the support bracket between an initial position and at least one succeeding forward adjustment position.

Additional features include the bun support plates each further exhibiting a modified triangular shape with an angled upper edge and a widened lower base. The locking pawl further includes a ratchet engaging portion at a first location, a shoulder abutment at a second location and an angular configured wing portion, such as extending at an angle relative to and between the ratchet and shoulder engaging portions.

The support bracket further exhibits an upwardly ramped portion upon which the plurality of ratchet defined portions are defined. The ramped portion terminates in an uppermost peak defining portion engaging a side location of the locking pawl engagement portion during succeeding adjustment to a forward most and reset triggering position, thus causing the locking pawl to pivot out of engagement with the ramp configured ratchet portions.

A cross support extends between spaced apart sides of the intermediate component and against which is abutted the shoulder location of the pivotal locking pawl at the forward most reset triggering position, the cross support maintaining contact with the locking pawl during rearward resetting/returning motion to an initial design position. The angular configured wing portion of the locking pawl contacts the peak of the ratchet ramp portion during final stages of resetting in order to reposition said locking pawl to the initial position.

Other features include the intermediate component exhibiting a pair of lower leg extending portions for pivotally securing to the ratchet defined bracket, the leg portions exhibiting extending edge locations which contact the pin supports at both forward and rearward most adjusted positions of the headrest. A biasing clock spring is also supported about a crosswise extending pin support and includes a first downwardly extending end abutting an edge of a central mounted portion associated with the support bracket. A second opposite and upwardly extending end of the spring biasing against a lower rim edge location of the three dimensional component.

BRIEF DESCRIPTION OF THE DRAWINGS

Reference will now be made to the attached drawings, when read in combination with the following detailed description, wherein like reference numerals refer to like parts throughout the several views, and in which:

FIG. 3 is a side view of the headrest shown in FIG. 2;

FIG. 4 is front view of the headrest and further illustrating the biasing coil spring for influencing the headrest to the rearward design position;

DETAILED DESCRIPTION OF THE PREFERRED EMBODIMENTS

Referring to the illustrations, the present invention discloses a multi-position manually adjustable headrest 10 for use with a vehicle seatback. In particular, the headrest provides for controlled and incremental adjustment between a rearward most and initial design position and successive forward positions. A most forward adjustment position corresponds with release/reset of the headrest which is thus caused to rearwardly and biasingly return to the initial design position.

Figure 1:
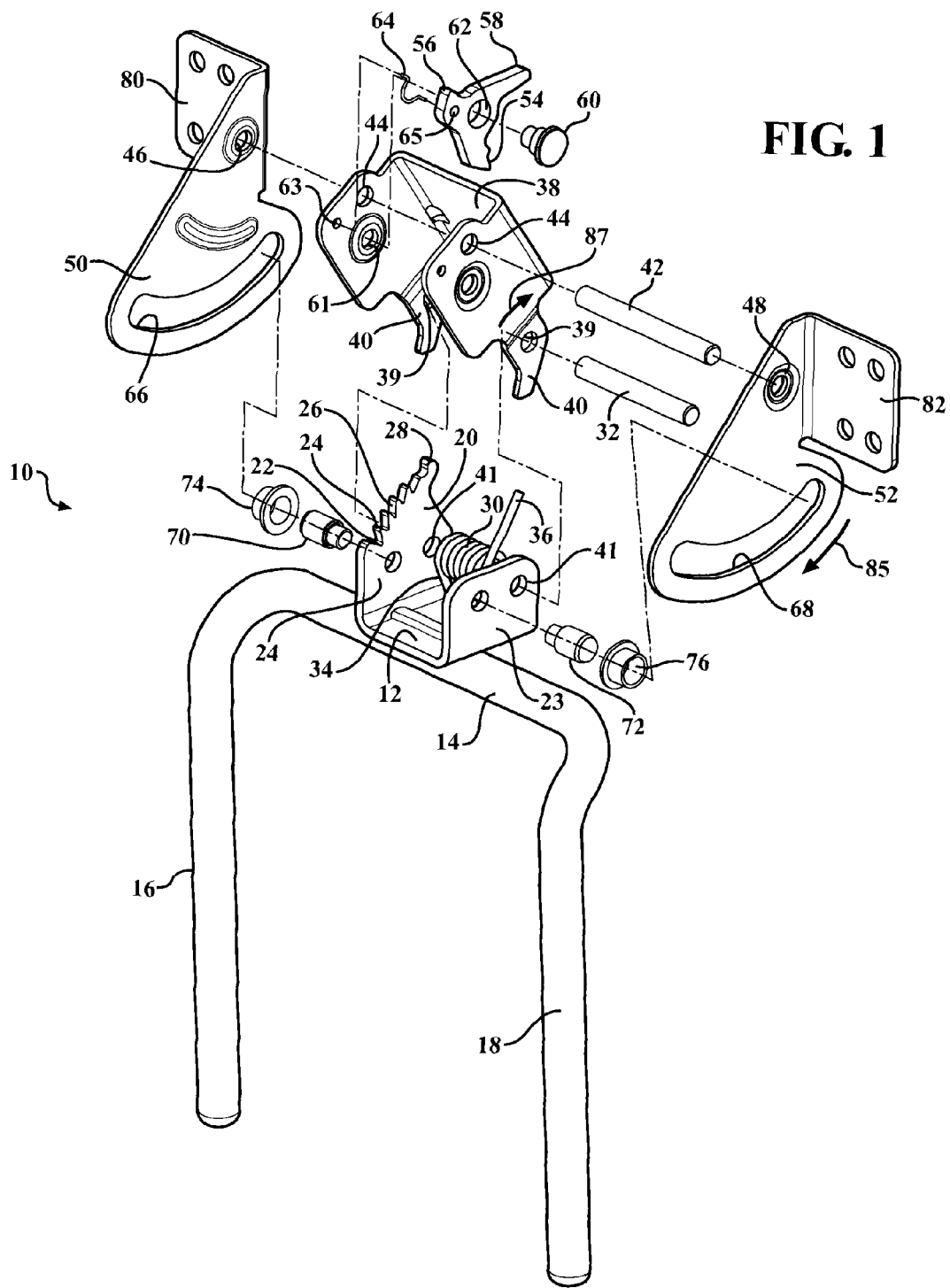
FIG. 1 is an exploded perspective of the multi-position and manually adjustable headrest.

Referring again to the exploded perspective of FIG. 1, as well as the successive assembly views, the headrest assembly incorporates a ratchet defined support bracket, see as is reflected by generally "U" shaped component 12 of which a central interconnecting portion is affixed, such as by welding or the application of fasteners (not shown) along a central extending portion 14 of a seatback secured and upwardly projecting rod (this further illustrating by pair of interconnecting and downwardly extending support portions 16 and 18) associated with the headrest. Without elaboration, the likewise "U" shaped rod can be adjustably mounted to the top of the seatback (not shown) to adjust an overall projecting height.

As further shown in FIG. 1, the support bracket 12 includes an elevating ramp 20 configuration integrally formed with and extending upwardly from a selected side (see further at 21 and 23). The ramp 20 is further exhibited by a plurality of ascending and serrated teethed, also termed ratchet defined portions, and shown at 22, 24, 26, et seq. extending from an initial design or first position (see FIG. 2) to an upper-most peak defined portion 28, this further corresponding to a final position triggering reset position.

As further illustrated in FIGS. 1 and 4, a biasing clock spring 30 is supported about a crosswise extending pin support 32 (FIG. 4), the spring 30 including a first downwardly extending end 34 abutting an edge of the central mounted portion 14 of the seatback supported rod. A second opposite and upwardly extending end 36 of the spring 30 biases against a lower rim edge location of an intermediate and three dimensional component 38, which is in turn pivotally secured in a biased fashion to the ratchet defined bracket (see further pin 32 in exploded FIG. 1 seating through aligning apertures 39 defined in each of first and second downwardly configured and extending support legs 40 associated with spaced apart sides of the intermediate component 38, these aligning with further apertures 41 arranged in aligning fashion along rear proximate locations of the sides 21 and 23 and through which the spring 30 is coaxially supported). In each instance, the term aperture as defined in the disclosure refers to an inner perimeter and arcuate extending wall or surface which defines an open passageway through the associated component, such as for permitting support pin or fastener to pass therethrough.

A further crosswise extending pin support 42 mounts through a further generally upper end aligning pair of apertures, see at 44, defined in the sides of the intermediate component 38. Opposite extending ends of the support 42 in turn seating through aperture locations 46 and 48 defined in a generally angled and upper corner of each of a pair of generally modified triangular shaped and headrest bun support plates 50 and 52, and such that the pin support 42 provides for pivoting of the intermediate bracket 38 concurrent with controlled displacement of the outer bun support plates 50 and 52.

Offset from the upper pin support 42 and pivotally mounted to an inside side surface of the intermediate component 38 in proximity to the ratchet configured ramp 20 is a biased locking pawl. As best shown in each of FIGS. 1 and 2, the locking pawl has a body including a ratchet engaging portion 54 at a first location, a shoulder engaging portion 56 at a second location, and an angular configured wing portion 58 at a third location extending at an angle relative to and between the ratchet 54 and shoulder 56 engaging portions.

A pivot pin 60 secures through an inner aperture 62 defined at an interior location in the locking pawl and mounts the same to an inside face of a selected side of the intermediate pivoting support bracket 38 which is in communication with the upwardly ramped portion 20 and such that the pin 60 installs through an alignment established by the aperture 62 in the locking pawl and a further aperture 61 (FIG. 1) defined in the side of the intermediate bracket 38. Another smaller clock spring 64 secures to a proximate side location 63 (see also FIG. 2) of the intermediate component 38 and exhibits an opposite end engaging through an aperture 65 in the locking pawl for biasing the locking pawl in a generally counterclockwise direction and in a direction towards a selected teethed or ratchet portion 22, 24, 26 et seq., further depending upon the pivotal location of the intermediate component 38, and in a manner as will be described further in additional detail.

Figure 8:
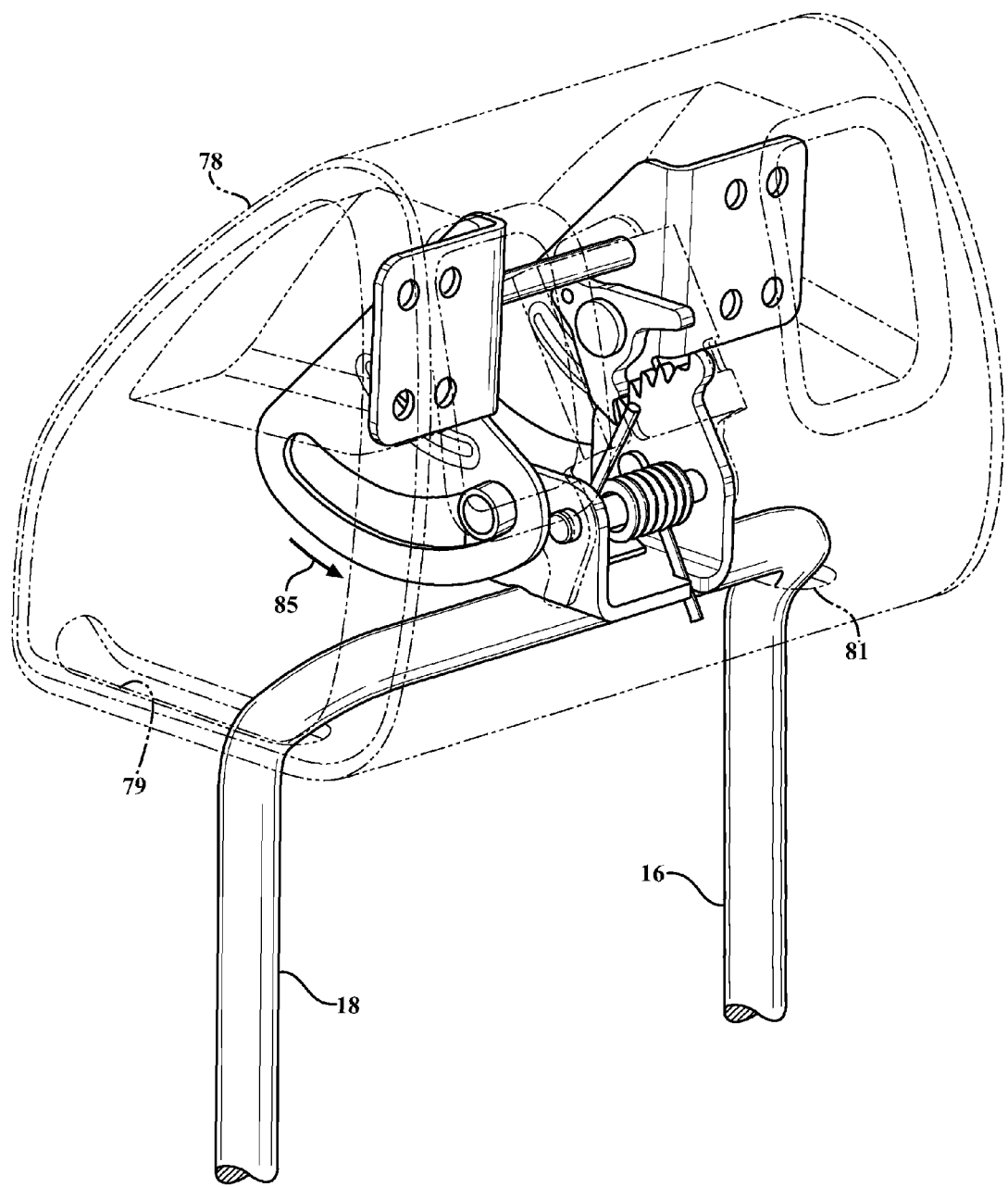
FIG. 8 is a similar view to that shown in FIG. 7 and illustrating the nature of mounting the ergonomic support bun to the spaced apart support plates and the downwardly extending sides of the seatback secured rod.

The outer headrest bun supporting plates 50 and 52 each further exhibit lower arcuate extending channels, see as shown by closed inner profile edges 66 and 68, extending along the widened base, and through which seats a pair of projecting pins 70 and 72 and associated end supported rivets 74 and 76 extending laterally from the sides of the base portion of the ratchet support bracket 12. In this manner the pin supported rivets are guided in travel along the channels 66 and 68 during controlled forward displacing travel of the support plates 50 and 52 (with concurrent pivoting of the intermediate support component 38 in a controlled path as defined by the pivot axes established by pins 32 and 42, the adjusting motion resulting from a manual readjustment force applied to a three dimensional headrest bun, see as shown at 78 in each of FIGS. 5, 6 and 8 and which, as best depicted in FIG. 8, exhibits an inner cavity with reinforced planar supports for securing the bun 78 to angled end (mounting) plates 80 and 82 extending from the supporting plates 50 and 52. As further best depicted in phantom in FIG. 8, the bottom of the bun 78 may further exhibit a pair of slot defined apertures 79 and 81.

Figure 2:
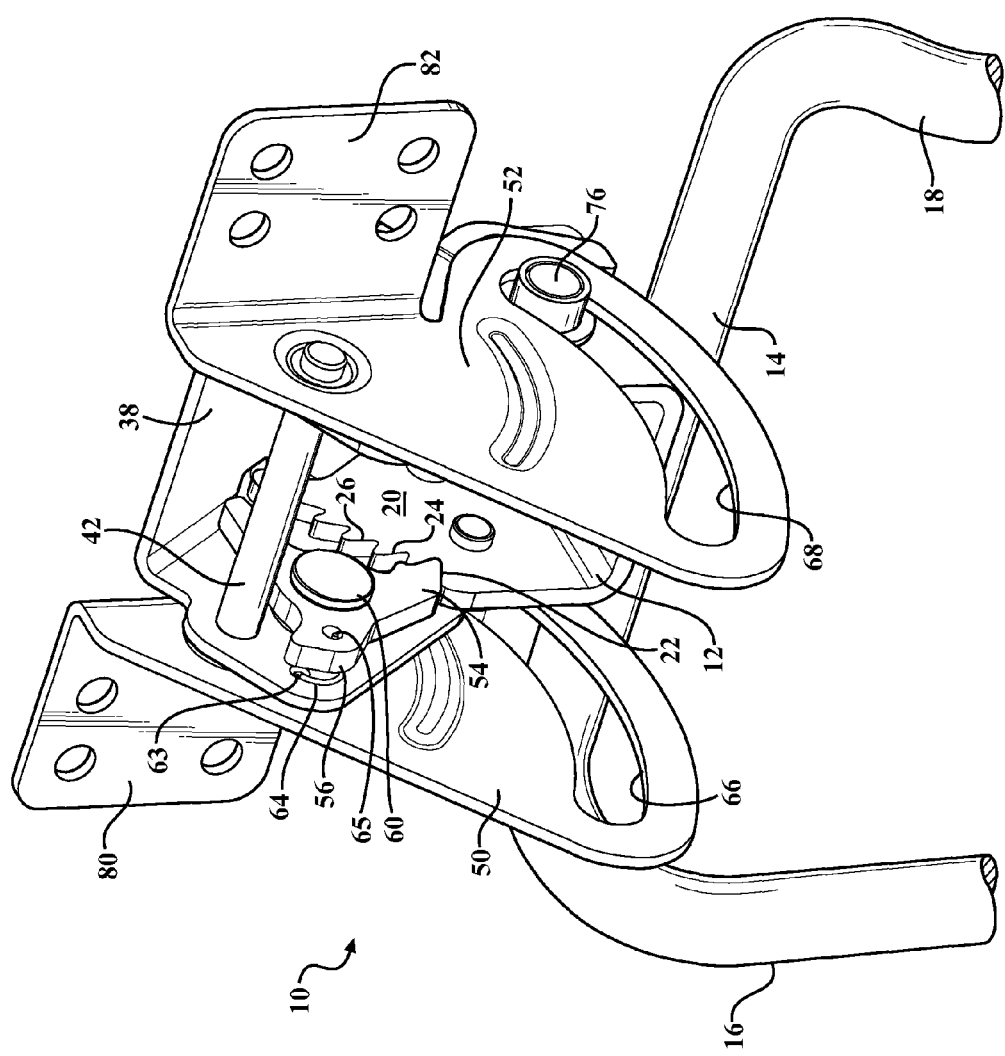
FIG. 2 is an assembled perspective of the headrest in a first rearward most design position.
Figure 5:
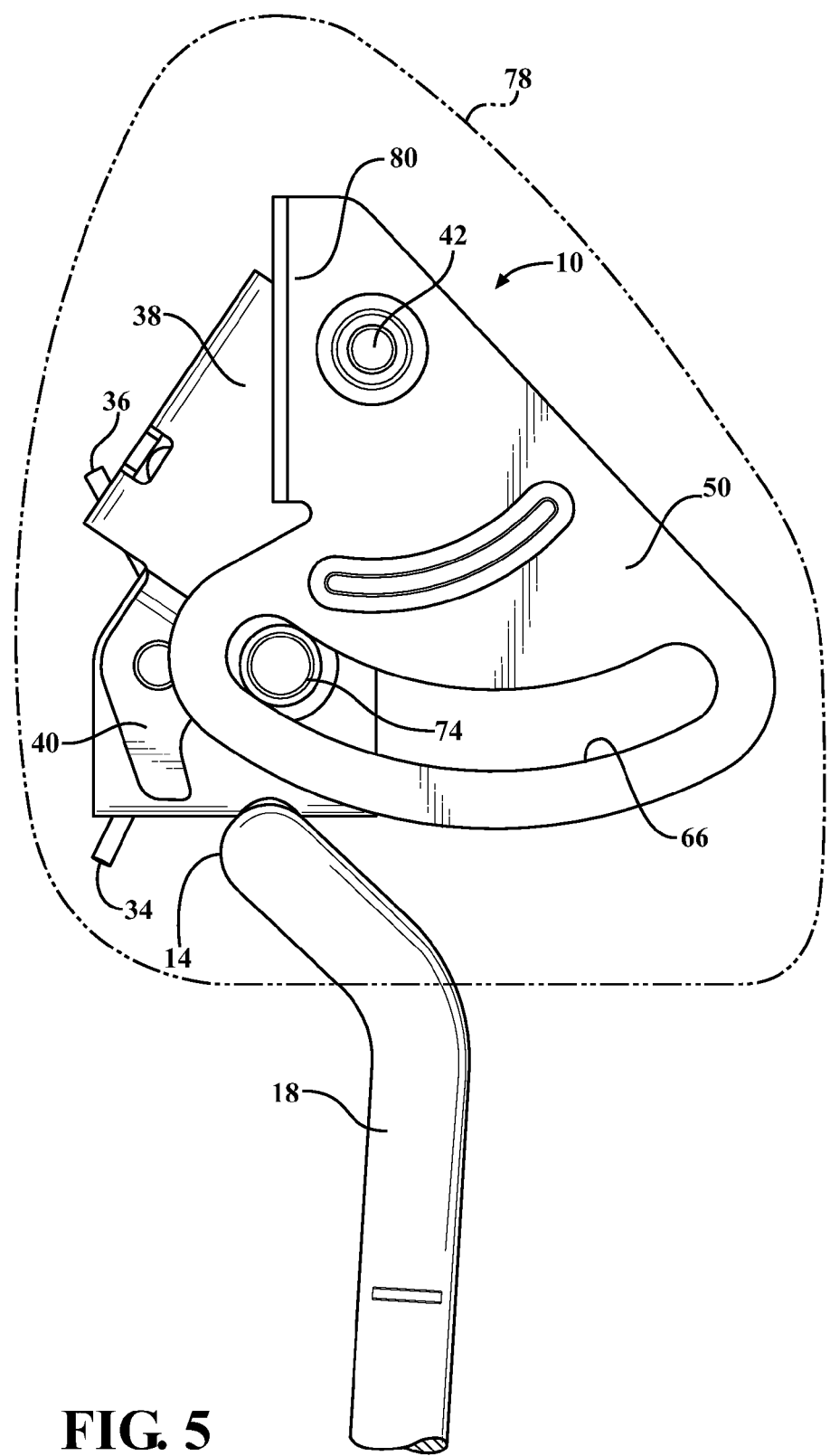
FIG. 5 is a similar side view of the design position shown in FIG. 3 and with the headrest bun secured over a pair of support plates associated with the assembly.
Figure 6:
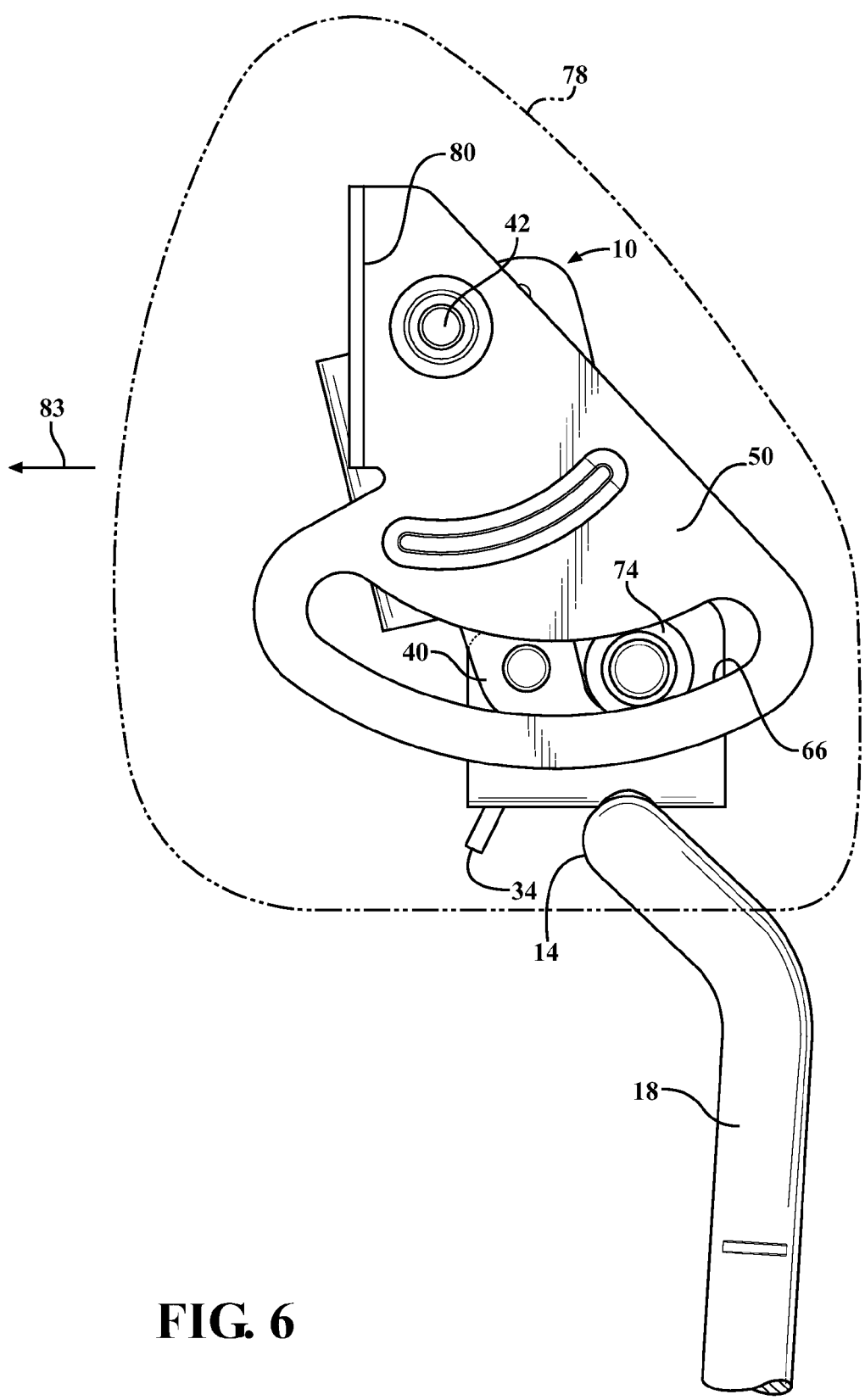
FIG. 6 is an succeeding side view in which the headrest is progressively adjusted to a generally forward most adjusted position.
Figure 7:
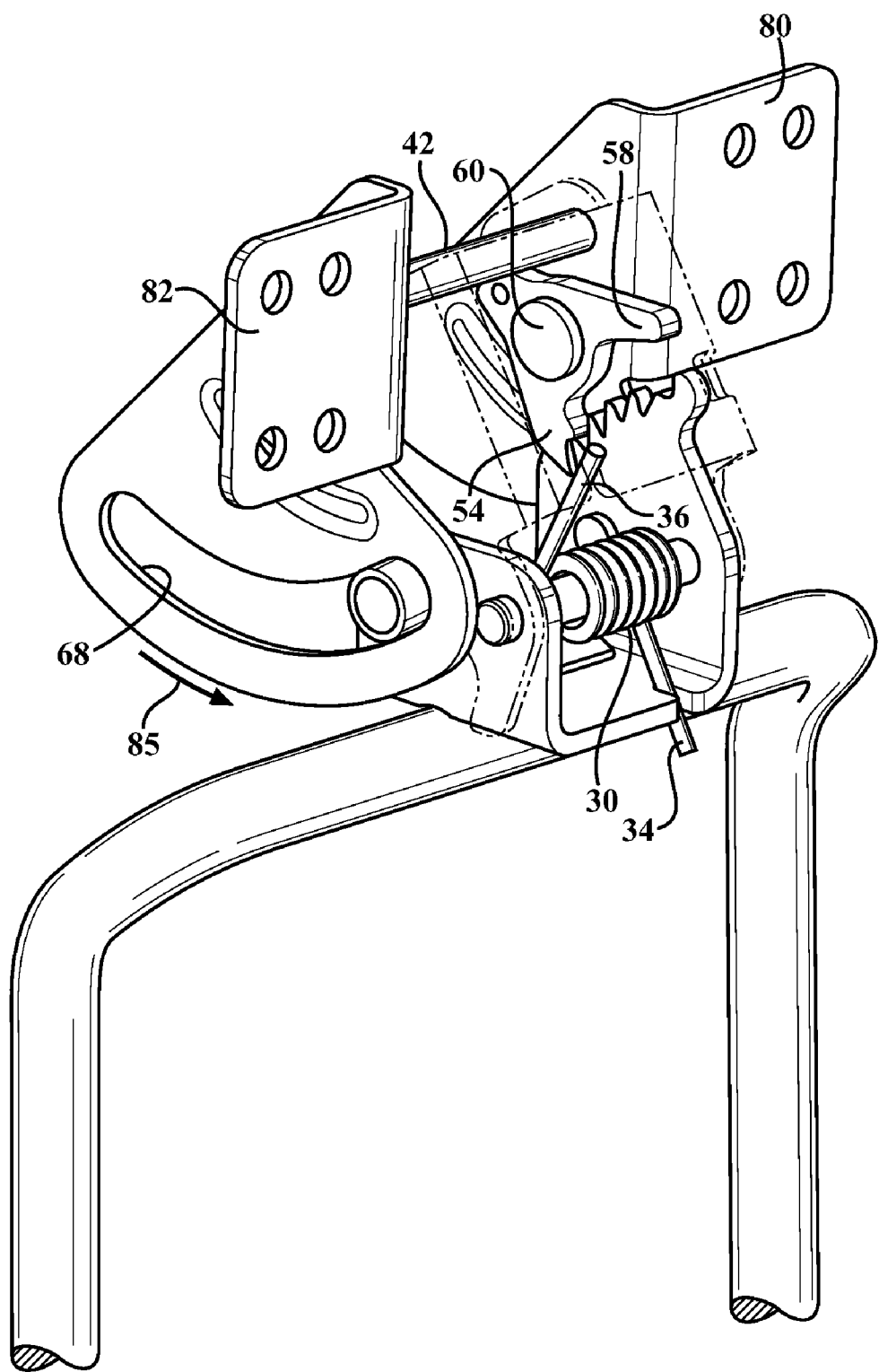
FIG. 7 is a further rotated perspective of the design position also depicted in FIGS. 2, 3 and 5 and illustrating the interplay of the locking pawl and U shaped bracket.

As referenced in the assembled perspective views of FIGS. 2 and 7, as well as the succeeding collection of side and front views of FIGS. 3-5, the locking pawl is again shown pivotally supported relative to the inside mounting surface of the intermediate component 38, and further such that its ratchet engaging portion 54 engages a selected teethed location (again shown at 22 exhibited on the inclined ramp 20 and which is representative of a first rearward most design position). The side view of FIG. 6 illustrates the headrest progressively forward adjusted to a generally forward most position (see also directional arrow 83) which is representative of the forward directed (typically manual) force which is exerted upon the headrest 78 and which causes the pins 74 and 76 to travel along the inner arcuate path established by the channels 66 and 68 in the headrest bun supporting plates 50 and 52.

A preferred embodiment contemplates a plurality of second, third and fourth manual adjustment positions corresponding to incrementally forward adjusting positions of the headrest bun 78 relative to the fixed ratchet support bracket 12 and concurrent with the ratchet engaging portion 54 of the locking pawl traveling upwardly along the teeth 22, 24, 26 et seq. associated with the upwardly inclined ramp 20 towards the upper peak end 28. Without limitation, the ratchet adjustment mechanism can include any number of successive adjustment positions.

Referring again to FIGS. 7 and 8, the headrest is illustrated in its substantially rearward most and initial design position. A directional motion exerted on the headrest support plates (see at 85 in each of FIGS. 1, 7 and 8) about its pivot point 42, and by virtue of the pins 74 and 76 traveling within the channels 66 and 68 (see also directional arrow at 85), causes the multi-axial and intermediate supported component 38 (again via coaxial pin 42 connecting to the headrest support plates 50 and 52 and offset pin 32 connected to the support bracket 12) to pivot in a generally opposite fashion, see further directional arrow 87 as best depicted in FIG. 7. The locking pawl, being secured to the inner side of the bracket 38 in communication with the ramped configuration, causes its ratchet engaging portion 54 to ascend to each succeeding ratchet location 24, 26, et seq. and, by virtue of its configuration and the structural interplay with the uppermost peak 28 of the incline ramp 20 and the proximately located and crosswise extending support 42, is further caused to pivoted to a non-engagement position, at which the effects of the biasing spring 30 cause the intermediate component 38 and pivotally interconnected bun support plates 50 and 52 to return to the initial design position of FIG. 2.

Figure 9:
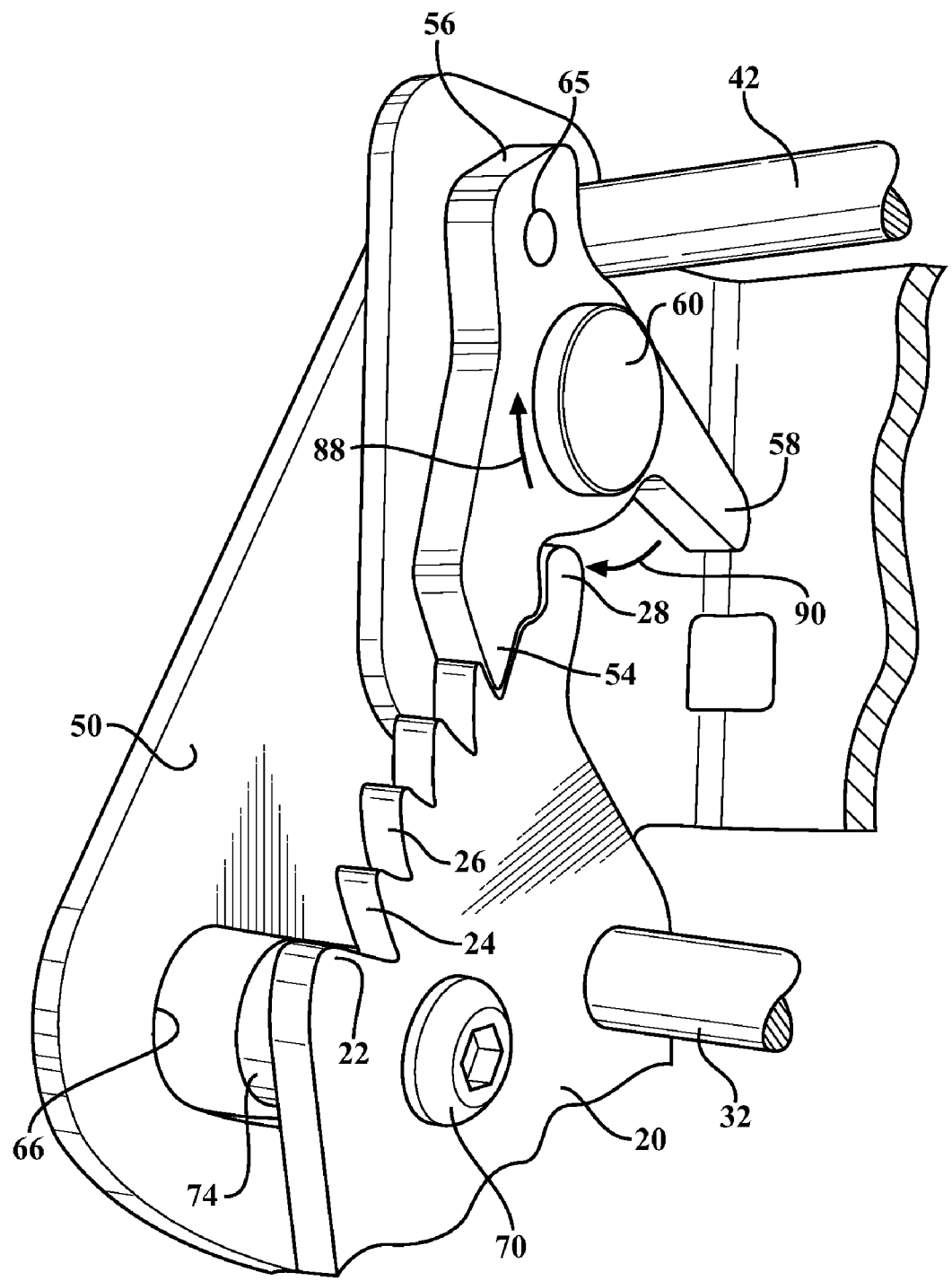
FIG. 9 is a rotated perspective view better illustrating the inter-engagement of the upper-most peak defining portion associated with the upwardly ramped ratcheting portions and corresponding side location of the locking pawl engagement portion, corresponding generally with an incrementally forward adjusting motion beyond the position generally depicted in FIG. 6, and such as occurring during succeeding adjustment to a fifth-most reset position thereby causing the locking pawl to pivot out of engagement with the ramp configured ratchet portions resulting in the cross wise extending support to maintain contact with the locking pawl during rearward travelling resetting/returning motion to the initial design position, with the locking pawl also illustrating the an angular configured wing portion which subsequently contacts the peak of the ratchet ramp portion during the final stages of resetting in order to reposition the locking pawl for engagement at the initial design position.

Referring finally to FIG. 9, a rotated perspective view better illustrates the inter-engagement of the upper-most peak defining portion 28 associated with the upwardly ramped ratcheting portions 22, 24, 26, et seq. and corresponding to the engaging location of the pivotal locking pawl engagement portion 54. As further shown, and during succeeding forward adjustment to the fifth-most reset position, the upper peak 28 exerts a force against the locking pawl (see directional arrow 88) causes the locking pawl to pivot out of engagement with the ramp configured ratchet portions and so that the locking pawl pivots a specified degree in the direction of arrow 88.

At this point, the cross wise extending support 42 comes into contact with the shoulder 56 of the locking pawl (see directional arrow 90 in FIG. 9) and maintains the pawl position during regressive (rearward) travelling resetting/returning motion of the bun to the initial design position (FIG. 2). During this reverse and descending motion, the angular wing portion 58 contacts the peak 28 of the ratchet ramp portion and, during final stages of the return/resetting motion, causes the locking pawl to counter-rotate in a reverse position to arrow 88, this in order to reposition the locking pawl engagement portion 54 for re-engagement at the initial design position at which point the exerting bias of the spring 64 maintains the locking pawl in a direction against the ratchet defined ramp 20. The configuration of the lower extending leg portions 40 associated with the intermediate component 38 is further such that selected edge locations contact the exterior supported rivets 74 and 76 (see FIG. 6 at forward most position) and to define both forward and rearward most adjusted positions of the headrest.

Having described our invention, other and additional preferred embodiments will become apparent to those skilled in the art to which it pertains, and without deviating from the scope of the appended claims. This can include incorporating a powered drive for pivoting the hung support plates and intermediate support bracket in either additional or substituting fashion to the manual adjustment protocol described herein.

I claim:

1. A multi-position adjustable headrest, comprising:
   a support bracket affixed atop a seat back having a plurality of ratchet defined portions;
   an intermediate and three dimensional shaped component pivotally secured in a biased fashion to said ratchet defined bracket, said intermediate component having a pivotally supported and biased locking pawl which, depending upon a pivotal location of said intermediate component, engages a selected ratchet portion of said support bracket; and
   a pair of headrest bun supporting plates pivotally secured at upper ends to spaced apart sides of said intermediate component, said supporting plates further having lower arcuate extending channels through which extend pin supports projecting laterally from opposite sides of said ratchet support bracket;
   said pin supports traveling along said channels during forward displacement of said bun support plates, resulting from a re-adjustment force applied to a headrest bun, concurrent and anti-bias rotation of said intermediate component in a controlled fashion occurring relative to said upper end pivotal connection between said intermediate component and said support plates and said pivotal connection between said intermediate component and said ratchet support bracket, such that said pivotally supported locking pawl engages a selected ratchet portion of said support bracket between an initial position and at least one succeeding forward adjustment position.

2. The headrest as described in claim 1, said bun support plates each further comprising a modified triangular shape with an angled upper edge and a widened lower base.

3. The headrest as described in claim 1, said locking pawl further comprising a ratchet engaging portion at a first location, a shoulder abutment at a second location and an angular configured wing portion extending at an angle relative to and between said ratchet and shoulder engaging portions.

4. The headrest as described in claim 3, said support bracket further comprising an upwardly ramped portion upon which said plurality of ratchet defined portions are defined, said ramped portion terminating in an uppermost peak defining portion engaging a side location of the locking pawl engagement portion, during succeeding adjustment to a forward most and reset triggering position, causing said locking pawl to pivot out of engagement with said ramp configured ratchet portions.

5. The headrest as described in claim 4, further comprising a cross support extending between spaced apart sides of said intermediate component and against which is abutted said shoulder abutment of said pivotal locking pawl at said forward most reset triggering position, said cross support maintaining contact with said locking pawl during rearward resetting/returning motion to an initial design position.

6. The headrest as described in claim 5, said angular configured wing portion of said locking pawl having a specified shape and size and contacting said peak of said ratchet ramp portion during a final stage of resetting in order to reposition said locking pawl to said initial position.

7. The headrest as described in claim 1, said intermediate component further comprising a pair of lower leg extending portions for pivotally securing to said ratchet defined bracket, said leg portions having extending edge locations which contact said pin supports at both forward and rearward most adjusted positions of the headrest.

8. The headrest as described in claim 1, further comprising a biasing clock spring supported about a crosswise extending pin support of said support bracket, said spring including a first downwardly extending end abutting an edge of a central mounted portion associated with said support bracket, a second opposite and upwardly extending end of said spring biasing against a lower rim edge location of said three dimensional component.

9. A multi-position adjustable headrest, comprising:
a rod extending upwardly from a vehicle seat back and including a central portion and first and second downwardly extending portions;
a "U" shaped support bracket affixed to said central portion and including an elevating ramp on a selected side having a plurality of ratchet defined portions;
an intermediate and three dimensional shaped component pivotally secured in a biased fashion to said support bracket;
a locking pawl supported in pivotal biased fashion to said intermediate bracket and which engages a first selected and lower most positioned ratchet portion of said support bracket in an initial position; and
a pair of headrest bun supporting plates pivotally secured at upper ends to spaced apart sides of said intermediate component, said supporting plates further having lower arcuate extending channels through which extend pin supports projecting laterally from opposite sides of said ratchet support bracket;
said pin supports traveling along said channels during forward pivotal displacement of said bun support plates, resulting from a re-adjustment force applied to a headrest bun which is applied over said headrest, concurrent opposite and anti-biased pivotal rotation of said intermediate component occurring relative to said upper end pivotal connection between said intermediate component and said support plates and said pivotal connection to said ratchet support bracket, said pivotally supported locking pawl successively engages further ratchet portions of said support bracket between an initial position and at least one succeeding forward adjustment position.

10. The headrest as described in claim 9, said bun support plates each further comprising a modified triangular shape with an angled upper edge and a widened lower base.

11. The headrest as described in claim 9, said locking pawl further comprising a ratchet engaging portion at a first location, a shoulder abutment at a second location and an angular configured wing portion, extending at an angle relative to and between said ratchet and shoulder engaging portions.

12. The headrest as described in claim 11, said elevating ramp terminating in an uppermost peak defining portion engaging a side location of the locking pawl engagement portion, during succeeding adjustment to a forward most and reset triggering position, causing said locking pawl to pivot out of engagement with said ramp configured ratchet portions.

13. The headrest as described in claim 12, further comprising a cross support extending between spaced apart sides of said intermediate component and against which is abutted said shoulder abutment of said pivotal locking pawl at said forward most reset triggering position, said cross support maintaining contact with said locking pawl during rearward resetting/returning motion to an initial design position.

14. The headrest as described in claim 13, said angular configured wing portion of said locking pawl having a specified shape and size and contacting said peak of said ratchet ramp portion during a final stage of resetting in order to reposition said locking pawl to said initial position.

15. The headrest as described in claim 9, said intermediate component further comprising a pair of lower leg extending portions for pivotally securing to said ratchet defined bracket, said leg portions having extending edge locations which contact said pin supports at both forward and rearward most adjusted positions of the headrest.

16. The headrest as described in claim 9, further comprising a biasing clock spring supported about a crosswise extending pin support of said support bracket, said spring including a first downwardly extending end abutting an edge of a central mounted portion associated with said support bracket, a second opposite and upwardly extending end of said spring biasing against a lower rim edge location of said three dimensional component.

17. The headrest as described in claim 9, further comprising a spring having a first end engaging said biasing pawl and a second end engaging said intermediate bracket.

18. A multi-position adjustable headrest, comprising:
a support rod extending upwardly from a vehicle seat back;
a support bracket affixed to said support rod and including an elevating ramp having a plurality of ratchet defined portions;
an intermediate component pivotally secured in a biased fashion to said support bracket;

a locking pawl supported in pivotal biased fashion to said intermediate bracket and engaging a first selected ratchet portion in an initial position; and a pair of headrest bun supporting plates pivotally secured at upper ends to spaced apart sides of said intermediate component, said supporting plates further having lower extending channels through which extend pin supports projecting laterally from opposite sides of said ratchet support bracket;

said pin supports traveling along said channels during pivotal displacement of said bun support plates, concurrent opposite and anti-biasing pivotal displacement of said intermediate component occurring relative to said upper end pivotal connection between said intermediate component and said supporting plates and said pivotal connection between said intermediate component and said ratchet support bracket, said locking pawl successively engages additional ratchet portions between an initial position and succeeding forward adjustment positions, said elevating ramp terminating in an uppermost peak defining portion engaging a side location of the locking pawl engagement portion, during succeeding adjustment to a forward most and reset triggering position, causing said locking pawl to pivot out of engagement with said ramp configured ratchet portions and said biasing force exerted on said intermediate bracket to return said locking pawl to said initial position.

19. The headrest as described in claim 18, said locking pawl further comprising a ratchet engaging portion at a first location, a shoulder abutment at a second location and an angular configured wing portion extending at an angle relative to and between said ratchet and shoulder engaging portions.

20. The headrest as described in claim 18, said intermediate component further comprising a pair of lower leg extending portions for pivotally securing to said ratchet defined bracket, said leg portions exhibiting extending edge locations which contact said pin supports at both forward and rearward most adjusted positions of the headrest.

* * * * *